(12) United States Patent
Neet et al.

(10) Patent No.: US 7,624,768 B2
(45) Date of Patent: Dec. 1, 2009

(54) METHOD AND APPARATUS FOR FORMING A WIRE TO INCLUDE COIL SEGMENTS

(75) Inventors: Kirk E. Neet, Pendleton, IN (US); David M. Kroll, Pendleton, IN (US)

(73) Assignee: Remy International, Inc., Anderson, IN (US)

( * ) Notice: Subject to any disclaimer, the term of this patent is extended or adjusted under 35 U.S.C. 154(b) by 0 days.

(21) Appl. No.: 11/442,841

(22) Filed: May 30, 2006

(65) Prior Publication Data
US 2007/0277899 A1    Dec. 6, 2007

(51) Int. Cl.
*B21F 3/00*    (2006.01)
*B21F 1/00*    (2006.01)
*B21D 5/04*    (2006.01)
*B21D 13/02*    (2006.01)

(52) U.S. Cl. .................. 140/92.1; 140/105; 72/308; 72/385

(58) Field of Classification Search ............... 140/92.1, 140/105; 72/306–309, 311, 381, 383–385, 72/127
See application file for complete search history.

(56) References Cited

U.S. PATENT DOCUMENTS 3,722,254 A * 3/1973 Katogir ...................... 72/383
4,739,643 A * 4/1988 Kuriyama et al. ............ 72/306

* cited by examiner

*Primary Examiner*—Dana Ross
*Assistant Examiner*—Teresa M Bonk
(74) *Attorney, Agent, or Firm*—Cantor Colburn LLP

(57) ABSTRACT

Disclosed is an apparatus for forming a wire to include coil segments useable in a dynamoelectric machine, the apparatus including a plurality of forming structures simultaneously moveable along an axis into a coil segment forming configuration, with at least a number of the plurality of forming structures being configured to hold a wire, and at least one actuating device associated with at least a number of the plurality of forming structures and configured to simultaneously move the number of the plurality of forming structures into the coil segment forming configuration.

4 Claims, 8 Drawing Sheets

METHOD AND APPARATUS FOR FORMING A WIRE TO INCLUDE COIL SEGMENTS

FIELD

This disclosure relates generally to an apparatus for forming a wire, and more particularly to an apparatus for forming a wire that is useable in a dynamoelectric machine.

BACKGROUND

Disposal of copper wire in slots of a stator core of a dynamoelectric machine requires a forming or shaping of the wire before insertion into stator slots. Typically, the wire is formed to include a plurality of coil segments. These coil segments are commonly formed in the wire via a rotating, barrel type device, onto which unformed wire is fed. The rotating device generally includes a plurality of forming protrusions that contact the wire to form the coil segments, wherein the coil segments are formed one at time over the protrusions, as the wire is rotated/fed onto the rotating device.

An obvious drawback to forming coil segments one at a time is the amount of time the process takes as compared to a process that could form a plurality of coil segments simultaneously. Therefore, a method and apparatus that could simultaneously form a plurality of coil segments in a copper wire would be desirable.

BRIEF SUMMARY

Disclosed is an apparatus for forming a wire to include coil segments useable in a dynamoelectric machine, the apparatus including a plurality of forming structures simultaneously moveable along an axis into a coil segment forming configuration, with at least a number of the plurality of forming structures being configured to hold a wire, and at least one actuating device associated with at least a number of the plurality of forming structures and configured to simultaneously move the number of the plurality of forming structures into the coil segment forming configuration.

Also disclosed is a method for forming a wire to include coil segments useable in a dynamoelectric machine, the method including simultaneously forming a plurality of coil segments in a generally linear configuration.

Further disclosed is an apparatus for forming a wire to include coil segments, the apparatus including an on-axis actuator defining a set of points including a first point and a plurality of additional points, the plurality of additional points displaced successively remotely of the first point, with successively more remote additional points being moveable by the on-axis actuator more quickly through space toward and away from the first point than successively less remote additional points, a plurality of forming structures associated with at least a number of the set of points, so that the formers are at least one of spaceable from each other and nestable with each other pursuant to movement of the on-axis actuator along an axis substantially parallel to an unformed wire, and at least one of the plurality of forming structures additionally being moveable in a substantially off-axis direction.

BRIEF DESCRIPTION OF THE FIGURES

The foregoing and other features and advantages of the present invention should be more fully understood from the following detailed description of illustrative embodiments taken in conjunction with the accompanying Figures in which like elements are numbered alike in the several Figures.

DETAILED DESCRIPTION

Figure 1:
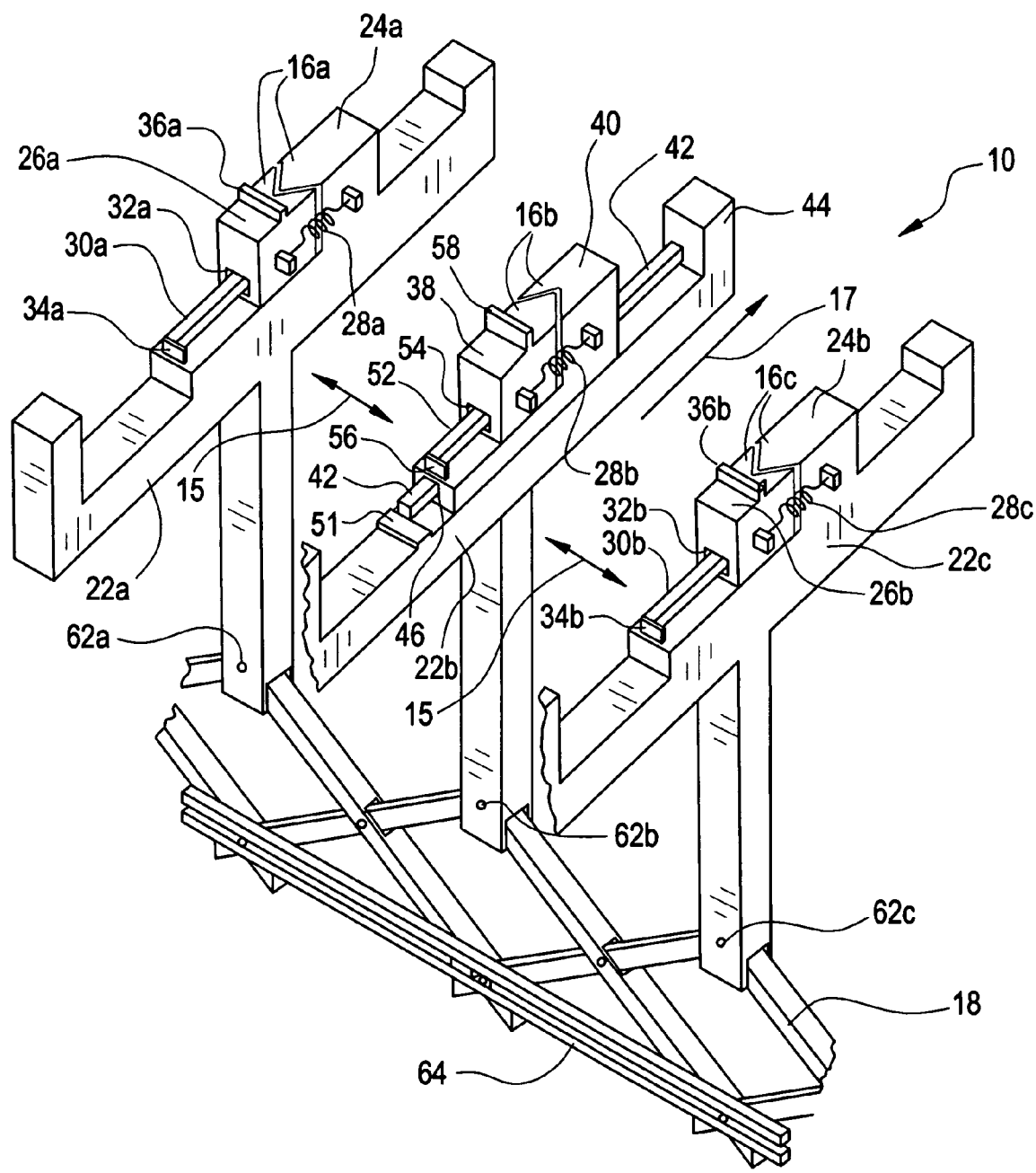
FIG. 1 is a side perspective schematic view of an apparatus for forming a wire to include coil segments.

Referring to FIGS. 1-6, an apparatus 10 for forming coil segments 12*a-c* (FIG. 6) in a wire 14 is illustrated. This apparatus 10 allows for simultaneous formation of multiple coil segments 12*a-c* (as many as desired) in the wire 14, particularly an insulated copper wire that may be used as a stator coil in a dynamoelectric machine, wherein the wire 14 may or may not be cut prior to formation. The ability to simultaneously form a plurality of coil segments 12*a-c* in a previously cut wire speeds up a coil segment forming process.

The apparatus 10 includes a plurality of forming structures 16*a-c*, wherein the forming structures 16*a* and 16*c* are moveable towards each other along an axis 15 that is substantially parallel to the unformed wire 14, and will be referred to as on-axis forming structures 16*a* and 16*c*. The forming structure 16*b* is moveable in an off-axis direction 17 as well as along the axis 15, and will be referred to as an off-axis forming structure 16*b*. Every other forming structure is moveable along the axis 15 and in the off-axis direction 17 like off-axis forming structure 16*b*. Thus every other forming structure is moveable only along the axis 15 like forming structures 16*a* and 16*c*. It should be appreciated that the axis 15 and the off-axis direction 17 may run substantially orthogonal to each other. The apparatus also includes an on-axis actuator 18 (that moves the forming structures along the axis 15), an off-axis actuator 20 (that moves the forming structures in the off-axis direction 17), and at least one association structure 22*a-c*, each of which being discussed in greater detail further along in the disclosure. It should also be appreciated that one off-axis forming structure (like 16*b*) in the apparatus 10, particularly a forming structure in a relative center of the apparatus 10 (i.e. an equal number of forming structures disposed on either side), may or may not be additionally moveable along the axis 15. If this one forming structure, which will be referred to as a home forming structure (not illustrated), were not moveable along the axis 15, the forming structures to either side of the one forming structure, would be moveable along the axis 15 towards the home structure. If desired, the home forming structure could actually be held in place so that it only moves in the off-axis direction 17. For example, if the forming structure 16*b* were a home forming structure that was intended not to move along the axis 15, it would be held or pinned in place so as to not be moveable along the axis 15, wherein the forming structures 16a and 16b would be moveable towards the home forming structure 16b along the axis 15. The home forming structure could be pinned in place using any manner of structures, such as rib structures (not illustrated), disposed one either side of the home forming structure, preventing it form moving along the axis 15. It should be appreciated that the off-axis forming structure 16b, or any other forming structure (including any on-axis forming structure), may be configured to act as the home forming structure.

The forming structures 16a-c will now be described in detail, beginning with the on-axis forming structures 16a and 16c. Each of the on-axis forming structures 16a and 16c includes a means for clamping or holding the wire 14. In one embodiment, the on-axis forming structures 16a and 16c include convex portions 24a-b, concave portions 26a-b, and clamping actuators 28a-b. The concave portions 26a-b may also have a different shape, such as a flat shape configured to hold the wire 14 against the convex portion 24a-b. The clamping actuators 28a-b act to bring together or close the convex portions 24a-b and concave portions 26a-b, wherein the clamping actuators 28a-b may be tension springs, lead screws, air-cylinders or other similar actuators that are attached to both the convex portions 24a-b and the concave portions 26a-b of each of the individual on-axis forming structures 16a and 16c.

Figure 2:
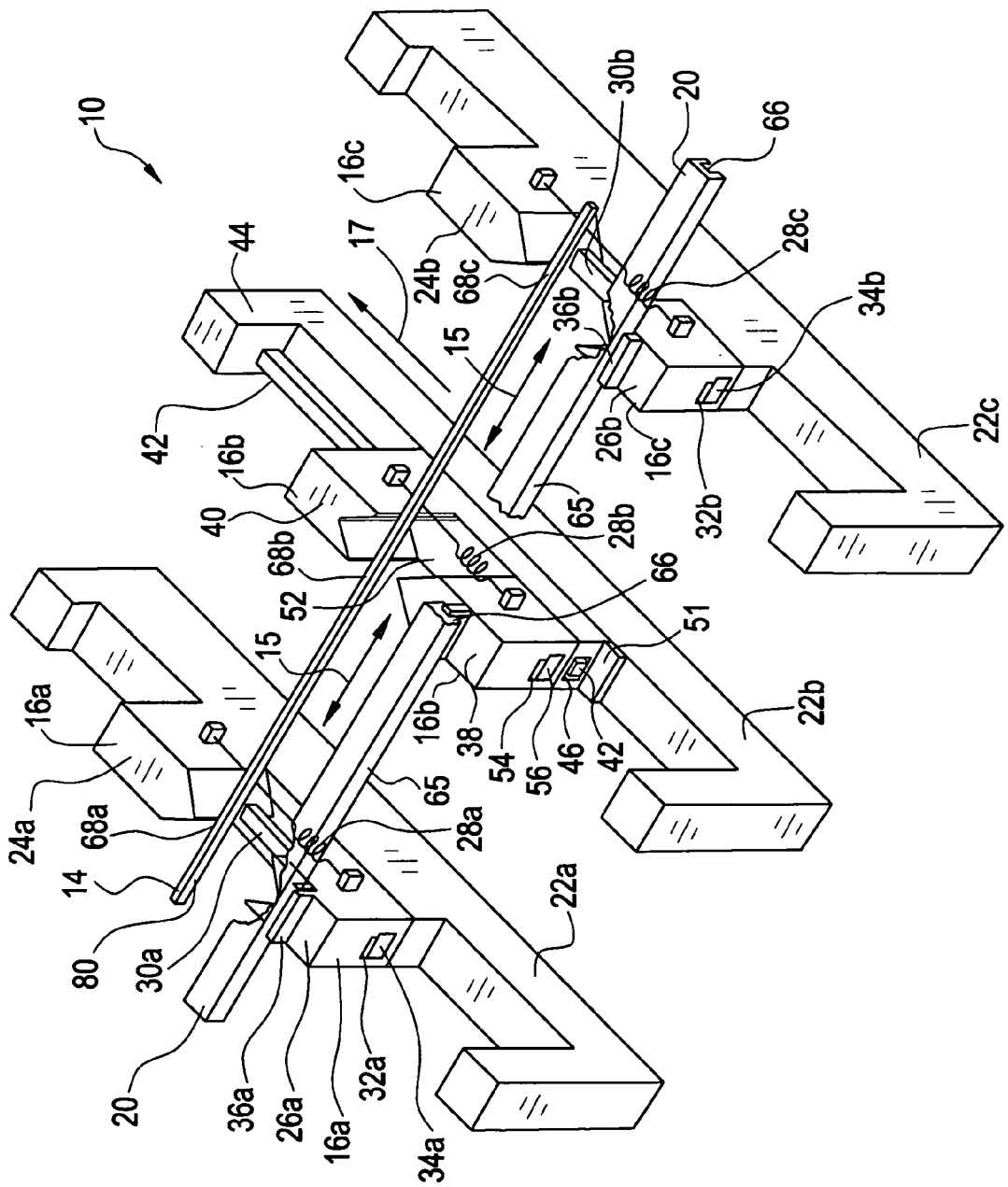
FIG. 2 is a side perspective schematic view of the apparatus for forming a wire to include coil segments, also showing the wire.

The on-axis forming structures 16a and 16c are associated with the on-axis actuator 18 via association structures 22a and 22c. The convex portions 24a-b are in fixed association with their respective association structures 22a and 22c, and may be of unitary construction with these association structures 22a and 22c. As is shown in FIG. 2, on-axis guides 30a-b protrude from each of the convex portions 24a-b, with each extending through an on-axis cavity 32a-b that is defined by each of the concave portions 26a-b. The presence of the on-axis guides 30a-b within on-axis cavities 32a-b allows each of the concave portions 26a-b to slide along the guides 30a-b towards and away from the convex portions 24a-b. Each guide 30a-b may also include an on-axis retaining feature 34a-b, which prevents the concave portions 26a-b from sliding off of the guides 30a-b. It should be appreciated however that protrusions extending from the association structures 22a and 22c may also accomplish this retention (see 51 discussed below). Additionally extending from the concave portions 26a-b are on-axis association protrusions 36a-b, which are associable with the off-axis actuator 20.

The off-axis forming structure 16b also includes a means for clamping or holding the wire 14. In one embodiment, the off-axis forming structure 16b includes a convex portion 38, a concave portion 40, and a clamping actuator 28b. The clamping actuator 28b acts to bring together or close the convex portion 38 and concave portion 40, wherein the clamping actuator 28b may be a tension spring, lead screw, or other similar actuator that is attached to both the convex portion 38 and the concave portion 40 of the off-axis forming structure 16b.

The off-axis forming structure 16b is associated with the on-axis actuator 18 via an association structure 22b. The off-axis forming structure 16 is associated with the association structure 22b via a first off-axis guide 42. The first off-axis guide 42 is fixed to a vertical portion 44 of the association structure 22b, and extends through a concave off-axis cavity 46 defined by the concave portion 40. The presence of the first guide 42 within the concave cavity 46 allows the concave portion 40 to slide along the first guide 42 towards and away from the vertical portion 44. A protrusion 51 extending from the association structure 22b may be included to prevent the concave portion 40 from sliding off of the first guide 42 (though retaining features like 34a-b above may also be used). In addition, as shown in FIG. 2, a second off-axis guide 52 protrudes from the concave portion 40, and extends through a convex off-axis cavity 54 that is defined by the convex portion 38. The presence of the second guide 52 within the convex cavity 54 allows the convex portion 38 to slide along the second guide 52 towards and away from the concave portion 40. The second guide 52 may also include an off-axis retaining feature 56, which prevents the convex portion 38 from sliding off of the guide 52. It should be appreciated however that protrusions extending from the association structure 22b (like, but possibly larger than the protrusion 51) may also accomplish this retention. Thus, the concave portion 40, and convex portion 38 to which it is associated, my slide along the first guide 42. Additionally extending from the convex portion 38 is an off-axis association protrusion 58, which is associable with the off-axis actuator 20.

Figure 6:
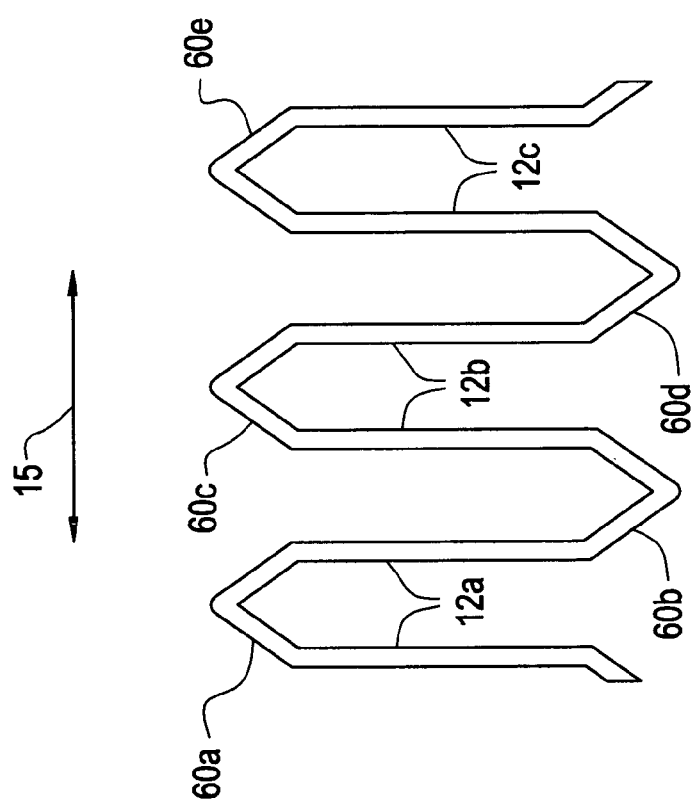
FIG. 6 is a side view of a plurality of coil segments.

It should be appreciated that each of the forming structures 16a-c (both on-axis and off-axis) are shaped in a manner that will allow the wire 14 to be formed to include a predetermined shape, such an end loop shape 60a-e, as is shown in the coil segments 12a-c of FIG. 6. As can be seen in FIG. 6, the coil segments 12a-c are formed in an alternating pattern of upper coil segments 60a, 60c, and 60e with lower coil segments 60b and 60d, aligned in a generally linear configuration 80 along the axis 15. Mechanisms by which these coils segments 12a-c will be formed and shaped using the forming structures 16a-c will be described in greater detail further along in the disclosure.

With the forming structures 16a-c described above, the actuators 18 and 20 will now be discussed, starting with the actuator 18. In one embodiment, the on-axis actuator 18 is a gate structure. The gate structure is the on-axis actuator 18 shown in FIGS. 1 and 4, and thus may be referred to hereinafter as the gate structure 18. The gate structure 18 is articulated with the association structures 22a-c at association joints 62a-c, and is capable of an accordion like compression that allows nesting of the forming structures 16a-c (this nesting will be described in greater detail below). A pull structure 64 is also articulated with the gate structure 18, and will also be discussed in greater detail below.

In one embodiment, the off-axis actuator 20 is a rod structure that may be moved via a cylinder (not illustrated). The rod structure is the off-axis actuator 20 shown in FIGS. 2-5, and thus may be referred to hereinafter as the rod structure 20. As was discussed above, the rod structure 20 is associable with the on-axis association protrusions 36a-b and off-axis association protrusion 58. The rod structure 20 includes an association side 65 that is associable with the on-axis protrusions 36a-b, and defines an association groove 66 that is associable with the off-axis protrusion 58. The manner in which the rod structure 20 associates with the protrusions 36a-b and 58 will be discussed in greater detail hereinbelow.

With the features of the apparatus 10 described, the manner by which the apparatus 10 forms the plurality of coil segments 12a-c will now be discussed. FIG. 1 illustrates the apparatus 10 prior to wire clamping. FIG. 2 illustrates an opening of the forming structures 16a-c via the off-axis actuator 20 (or rod structure 20). As is shown in this Figure, the off-axis actuator 20 has been moved into association with the on-axis association protrusions 36a-b and off-axis association protrusion 58 via the cylinder (not illustrated). The off-axis association protrusion 58 associates with the off-axis actuator 20 by entering the association groove 66. In addition, as the off-axis association protrusion 58 and the off-axis actuator 20 associate, the association side 65 of the off-axis actuator contacts the on-axis protrusions 36a-b. The off-axis actuator 20 then moves the concave portions 26a-b of the on-axis forming structures 16a and 16c away from the convex portions 24a-b, against action of the clamping actuators 28a and 28c (or possibly against tension of the tension springs), while moving the convex portion 38 of the off-axis actuator 16b away from the concave portion 40 against action of the clamping actuator 28b (or again, possibly against tension of the tension spring). The concave portions 26a-b of the on-axis forming structures 16a and 16b and the convex portion 38 of the off-axis actuator 16b do not fall off the on-axis guides 30a-b and second off-axis guide 52 respectively because of the on-axis retaining features 34a-b and off-axis retaining feature 56. The concave portions 26a-b of the on-axis forming structures 16a and 16b move away while the convex portions 24a-b remain stationary because the convex portions 24a-b are in fixed association with their respective association structures 22a and 22c. Similarly, the convex portion 38 of the off-axis actuator 16b moves away while concave portion 40 remains stationary because the concave portion 40 contacts the protrusion 51 of the association structure 22b, impeding the concave portion 40 from moving too far away from the vertical portion 44. Once the forming structures 16a-c are opened in this manner, the wire 14 may be disposed between the convex portions 24a-b and 38 and the concave portions 26a-b and 40 of each.

Figure 3:
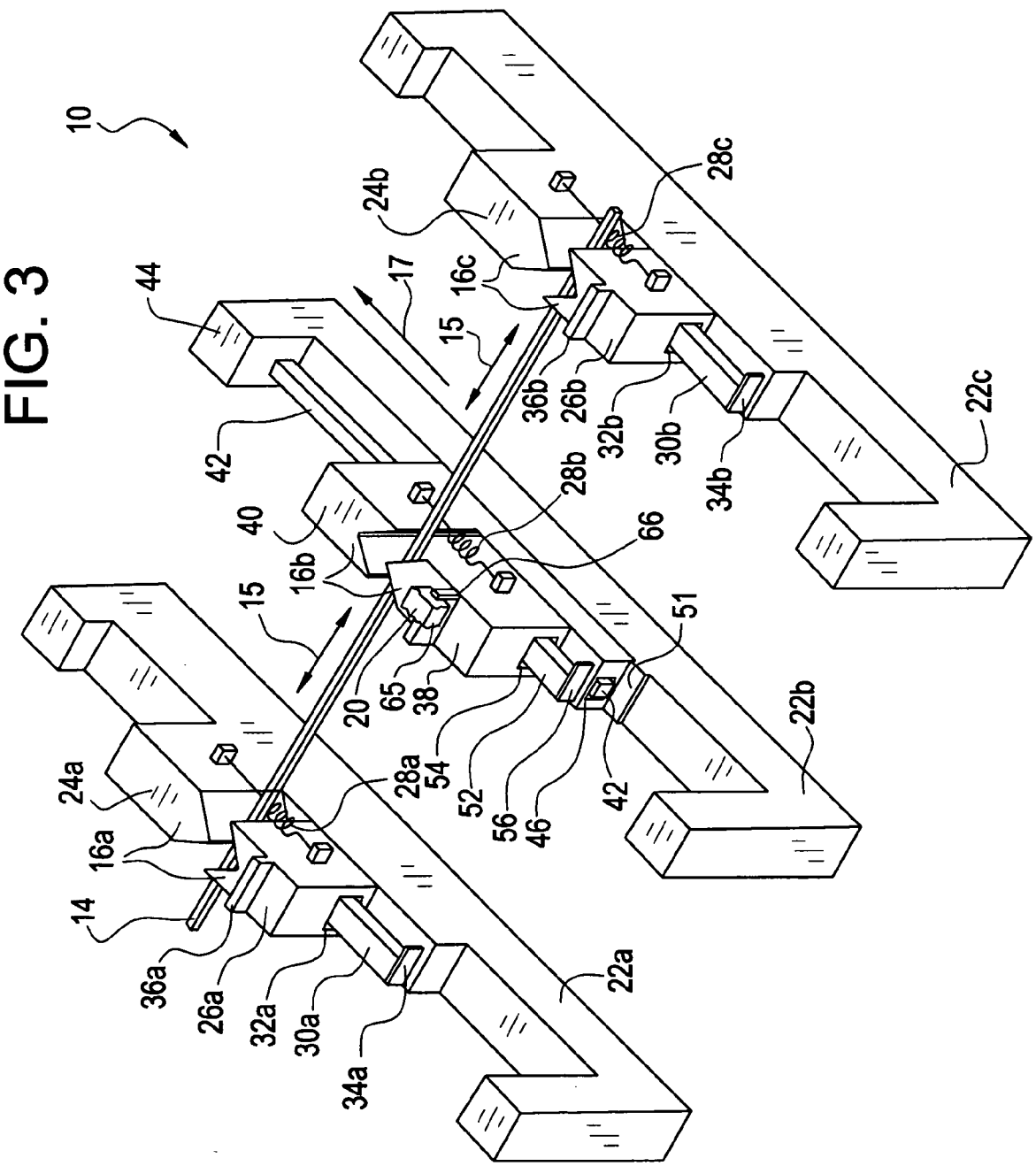
FIG. 3 is a side perspective schematic view of the apparatus for forming a wire to include coil segments, wherein forming structures are closing upon the wire.

Referring to FIG. 3, once the wire 14 is disposed between the convex portions 24a-b and 38 and the concave portions 26a-b and 40 of the forming structures 16a-c, the off-axis actuator 20 may cease to actuate (or hold) the concave portions 26a-b of the on-axis forming structures 16a and 16c and convex portion 38 of the off-axis actuator 16b against the action of the clamping actuators 28a-c. Thus, the clamping actuators 28a-c are allowed to move the concave portions 26a-b of the on-axis forming structures 16a and 16c and convex portion 38 of the off-axis actuator 16b back towards the convex portions 24a-b and concave portion 40 respectively. As these concave portions 26a-b and 40 convex portions 24a-b and 38 of the respective forming structures 16a-c move together in response to the clamping actuators 28a-c, the wire 14 is clamped. It should be appreciated however, that the association groove 66 of the off-axis actuator 20 remains in association with the off-axis association protrusion 58 while the clamping actuators move the concave portions 26a-b of the on-axis forming structures 16a and 16c and convex portion 38 of the off-axis actuator 16b back towards the convex portions 24a-b and concave portion 40 respectively. The actuator 20 may thusly move with the convex portion 38 back towards the vertical portion 44. In fact, if desired, it may be actively moving the convex portion 38 in this direction, eliminating the need for the clamping actuator 28b. However, when the off-axis actuator 20 begins to move towards the vertical portion 44, the association side 65 of the off-axis actuator 20 is no longer acting upon the on-axis association protrusions 36a-b, rendering the clamping actuators 28a and 28c responsible for bringing the concave portion 26a-b of the on axis forming structures 16a and 16c towards the convex portions 24a-b of the on axis forming structures 16a and 16c respectively.

Figure 4:
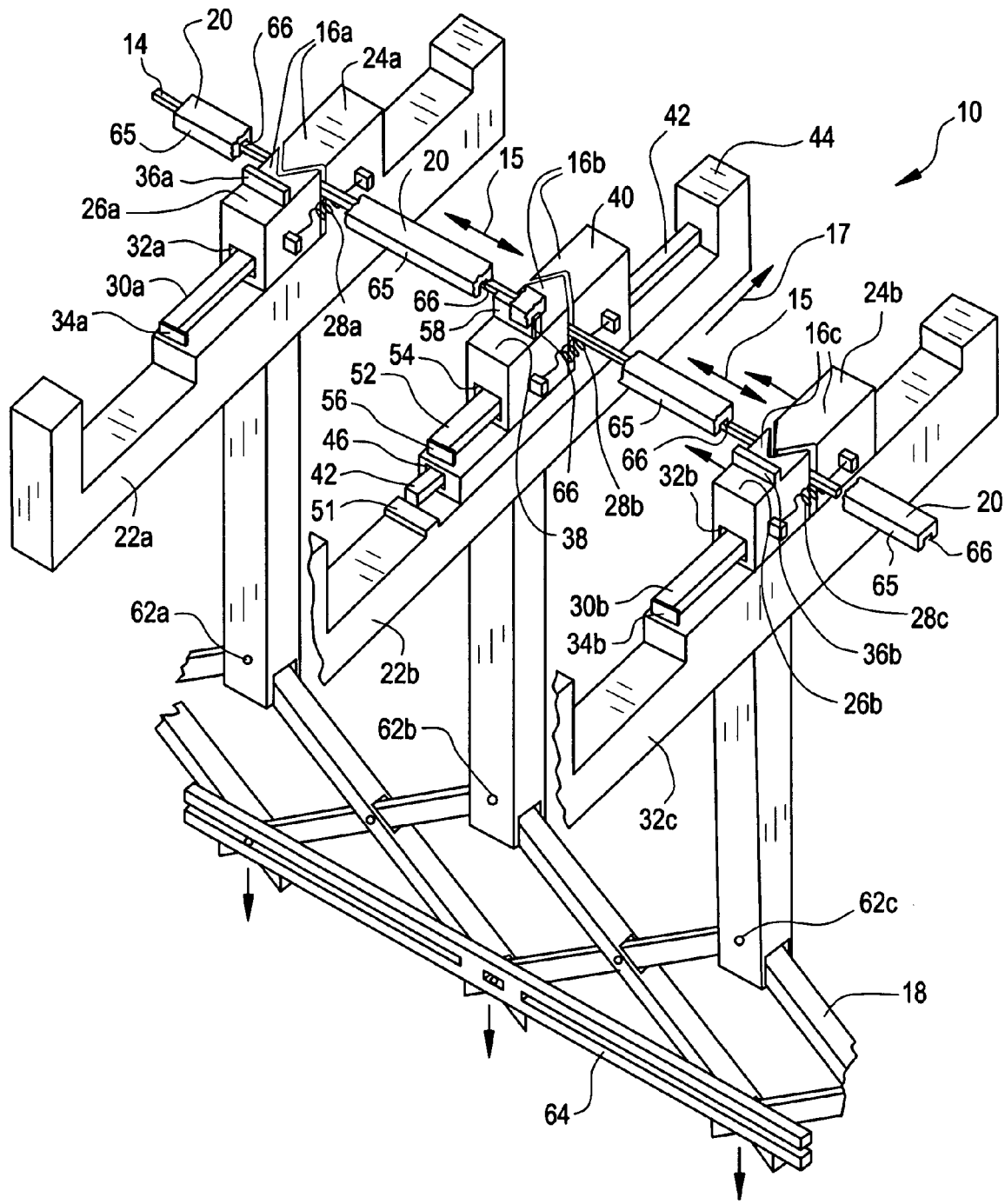
FIG. 4 is a side perspective schematic view of the apparatus for forming a wire to include coil segments, wherein the coil segments are holding the wire.

Referring to FIG. 4, once the wire 14 is clamped, the off-axis actuator 20, which is still in association with the off-axis association protrusion 58 via the association groove 66, may either temporarily stop moving towards the vertical portion 44, or continue movement in that direction. If movement of the off-axis actuator 20 stops, the forming of the coil segments 12a-c via the apparatus 10 will stop until the off-axis actuator 20 continues its movement, and the on-axis actuator 18 (the gate structure 18) simultaneously begins to move. If the off-axis actuator 20 continues to move, movement of the on-axis actuator 18 will begin upon clamping of the wire 14, and coil segment 12a-c formation will continue. Either way, movement of the off-axis actuator 20 towards the vertical structure 44 after clamping of the wire 14 will coincide with simultaneous movement, or nesting, of the on-axis actuator 18. This movement of the off-axis actuator 20 moves both the convex portion 38 and concave portion 40 of the off-axis forming structure 16b (to which it remains associated via the association groove 66 and off-axis association protrusion 58) along the first off-axis guide 42, also in the direction of the vertical portion 44 (i.e. in the off-axis direction 17).

Figure 5:
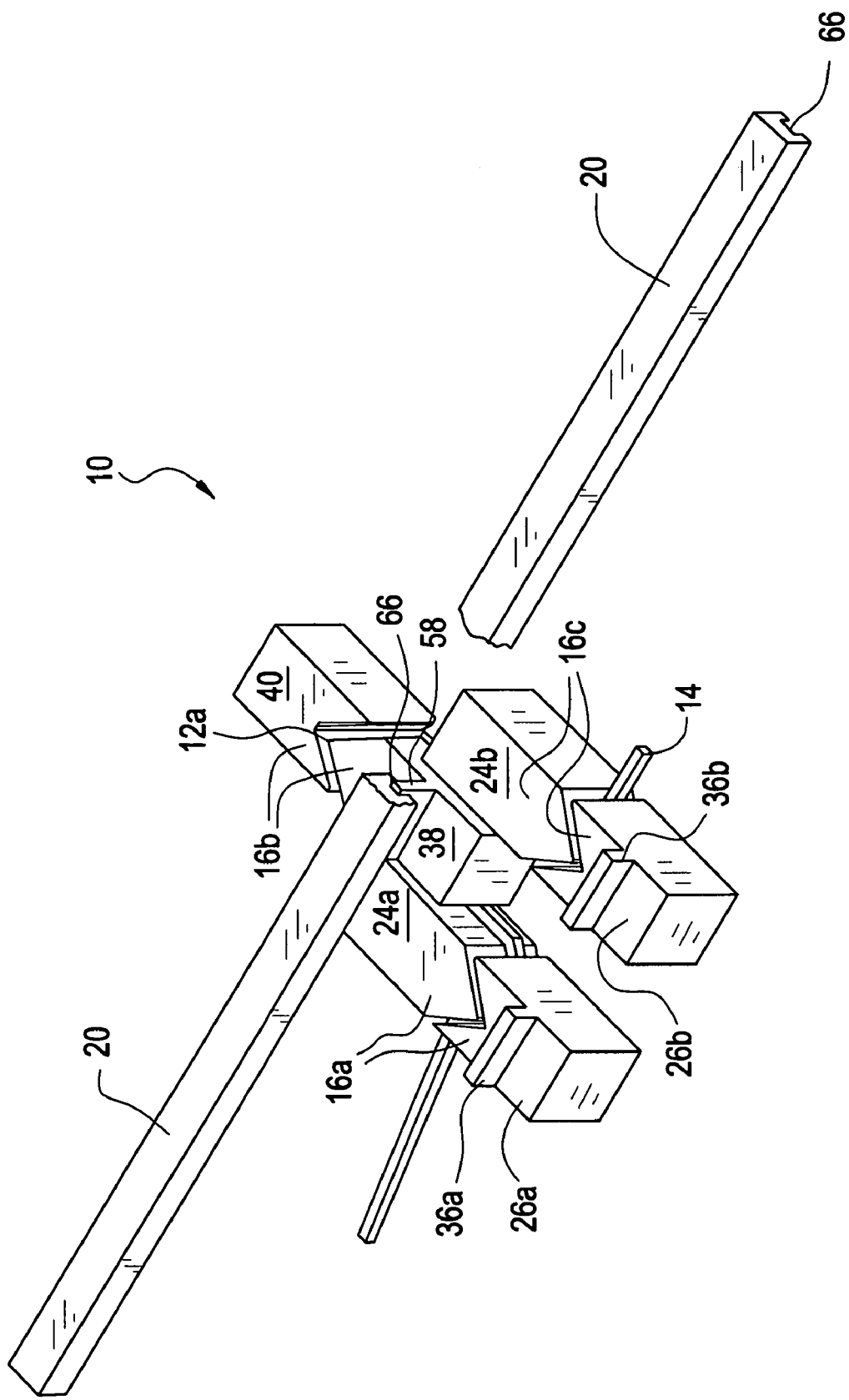
FIG. 5 is a top perspective schematic view of the apparatus for forming a wire to include coil segments, the forming structures in a coil segment forming configuration.

As mentioned above, and referring to FIGS. 4 and 5, simultaneous forming of the coil segments 12a-c takes place via movement of the on-axis actuator 18 and off-axis actuator 20. Movement of the on-axis actuator 18 is initiated by pulling the pull structure 64 away from the association structures 22a-c. Pulling the pull structure 64 in this direction nests the gate structure 18 (on-axis actuator 18), bringing the forming structures 16a-c and association structures 22a-c closer together along the axis 15. This movement creates a force that will bend the clamped wire 14. Because the off-axis actuator 20 is moving the off-axis forming structure 12b towards the vertical portion 44 (in the off-axis direction 17) at the same time the on-axis actuator 18 is bringing (nesting) all the forming structures 16a-c together, the wire 14 bends in a manner that forms the coil segment 12a, as shown in FIGS. 5 and 6. The forming structures 16a-b are simultaneously moved in this manner until they reach a coil segment forming configuration 76, as shown in FIG. 5, thus forming the coil segments 12a-c.

It should be appreciated that the forming structures 16a-c in the apparatus 10 maintain a hold on the wire 14 at contact areas 68a-c throughout movement of the forming structures 16a-c. Thus, slippage of the wire 14 over or between the forming structures 16a-c during coil segment 12a-c formation is avoided, and a work hardening that would be caused in a wire that would have to continually slide and bend along a contact point on the forming structures 16a-c is also avoided. It should also be appreciated that closing/clamping the forming structures 16a-c may be responsible for at least partially, and simultaneously, forming the end loop shape 60a-e (as shown in FIGS. 5 and 6) in each of the plurality of coil segments 12a-c of the wire 14, while simultaneous movement of the forming structures 16a-c completes formation of the plurality of coil segments 12a-c. It should be further appreciated that the forming structures 16a-c may be of any shape necessary to form any end loop shape that may be desirable.

Additionally, it should be appreciated that any actuator that can nest a plurality of forming structures 16a-c in a manner that allows all the forming structures 16a-c (as many as needed) to simultaneously move together at the same time may be used in the apparatus 10. It should also be appreciated that the forming structures 16a-c may be used in any number in the apparatus, with the forming structures (as mentioned above) alternating between on-axis actuator and off-axis actuator 20 as shown in the FIGS. 1-5.

Figure 7:
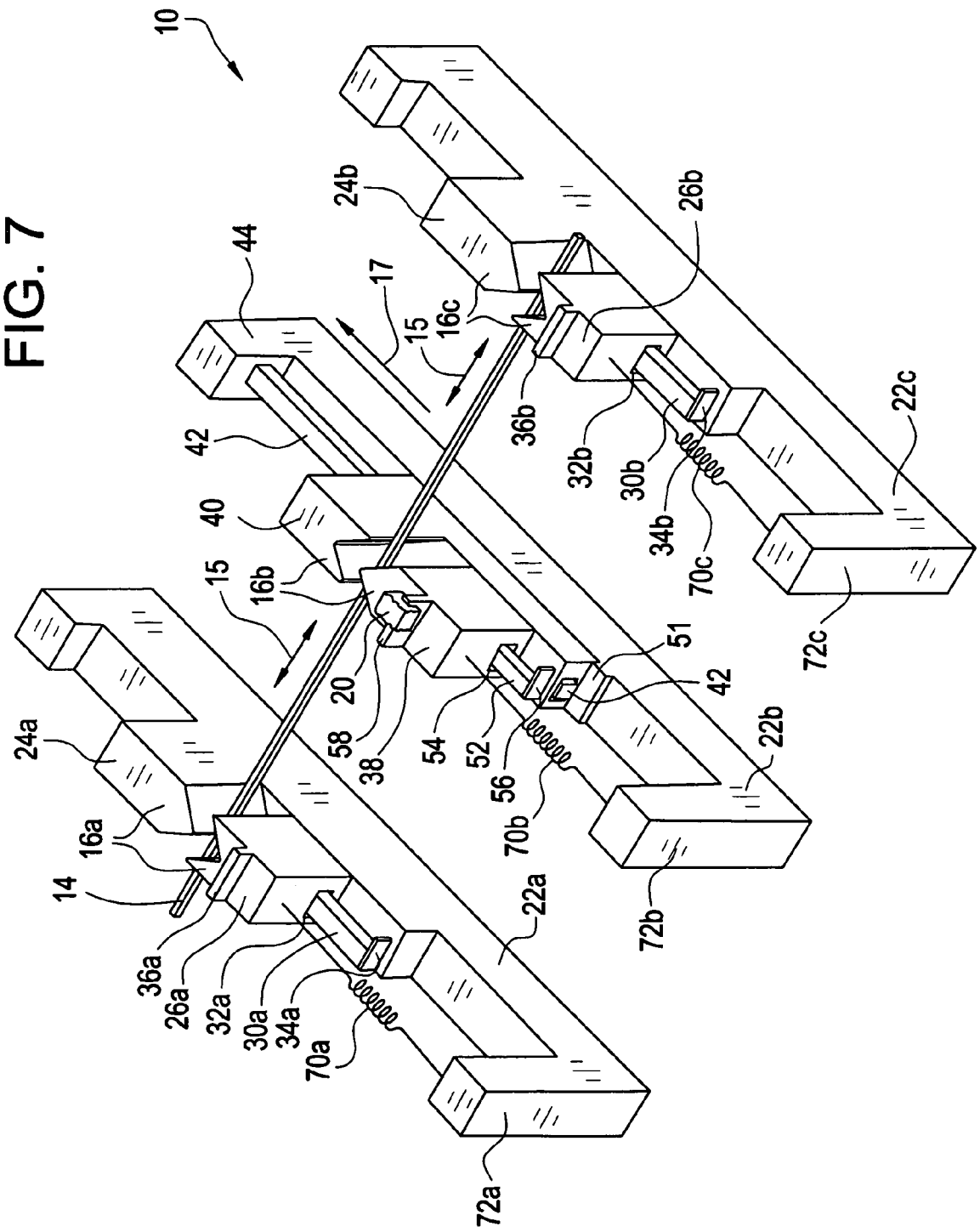
FIG. 7 is a side perspective schematic view of the apparatus for forming a wire to include coil segments, also showing push actuators.

Referring to FIG. 7, the apparatus 10 is shown with push actuators 70a-c taking the place of the clamping actuators 28a-c from FIGS. 1-4. The push actuators 70a-c are associated with second vertical portions 72a-c of the associating structures 22a-c. The push actuator 70a associates the second vertical portion 72a with the concave portion 26a of the on-axis forming structure 16a, the push actuator 70b associates the second vertical portion 72b with the convex portion 38 of the off-axis forming structure 16b, and the push actuator 70c associates the second vertical portion 72c with the concave portion 26b of the on-axis forming structure 16c. These push actuators 70a-c may be any actuating device, such as a compression spring or lead screw that pushes the concave portions 26a-b of the on-axis forming structure 16a and 16c and the convex portion of the off-axis actuator 38 away from the second vertical structures 72a and 72c and second vertical structure 72b respectively, thus closing the forming structures 16a-c on the wire 14.

Referring back to FIG. 1 and only referring (as an example) to the side of the apparatus 10 including forming protrusion 16c. When the gate structure 18 is activated, the forming protrusion 16c moves along the axis 15 until it reaches its final position which can be seen in FIG. 5, and an adjacent forming protrusion (not illustrated, but a second forming protrusion in line away from the forming protrusion 16b) also moves along the axis 15 (as well as in the off-axis 17 direction) until it reaches a location just abutting the forming protrusion 16c (but shifted in the off axis 17 direction similarly to forming protrusion 16b). Therefore, in the same amount of time (the time to activate the gate structure 18), the forming protrusion that is second in line away from the forming protrusion 16b, and adjacent to forming protrusion 16c, moves twice as far along the axis 15 as the forming protrusion 16c. Therefore the speed of the next in line, adjacent forming protrusion (along the axis 15) is twice as fast as the forming protrusion 16c. This pattern repeats in succession as a still next in line on-axis forming protrusion (not illustrated, but a third forming protrusion in line away from the forming protrusion 16b) would move three times as far and therefore three times as fast as forming protrusion 16c, and so forth. This pattern may also be present along the side of the apparatus including forming structure 16a, if it is desired that the forming structures on each side of the forming structure 16b are to be moved towards forming structure 16b.

Figure 8:
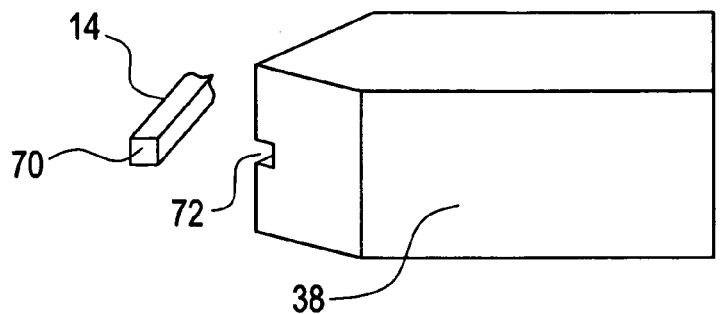
FIG. 8 is perspective view of a forming protrusion of the apparatus for forming a wire to include coil segments.

It should further be appreciated that the wire 14, as can be seen in FIGS. 2 and 8, may have a substantially rectangular cross sectional shape 80. For those skilled in the art, it is known that the rectangular cross sectional shape 80 may include radii on the corners of adjacent edges. It is desired to keep the orientation of the rectangular cross-sectional shape 80 consistent throughout the forming of the wire 14 into the coils segments 12a-12c (i.e. no twisting of the wire). To accomplish the consistent orientation, at least one groove 72, as shown in FIG. 8, may be formed in the tips of the forming protrusions, such as forming protrusion 38. The groove 72 would be slightly larger than the width of the wire 14 and would not allow the wire 14 to twist during the forming operation. To allow for ease of loading the wire 14, the apparatus 10 may be rotated 90 degrees around the axis 15 such that gravity holds the wire in the groove 72 (not shown). Furthermore, to increase the speed of forming a wire, it may be desirable to simultaneously form a plurality of wires, such as wire 14, by loading a plurality of wires staggered from each other along the tips of the forming protrusions, such as forming protrusion 38. To accomplish the consistent orientation, a plurality (not shown) of grooves, such as groove 72, may be formed in the tips of each forming protrusion, such as forming protrusion 38.

Figure 9:
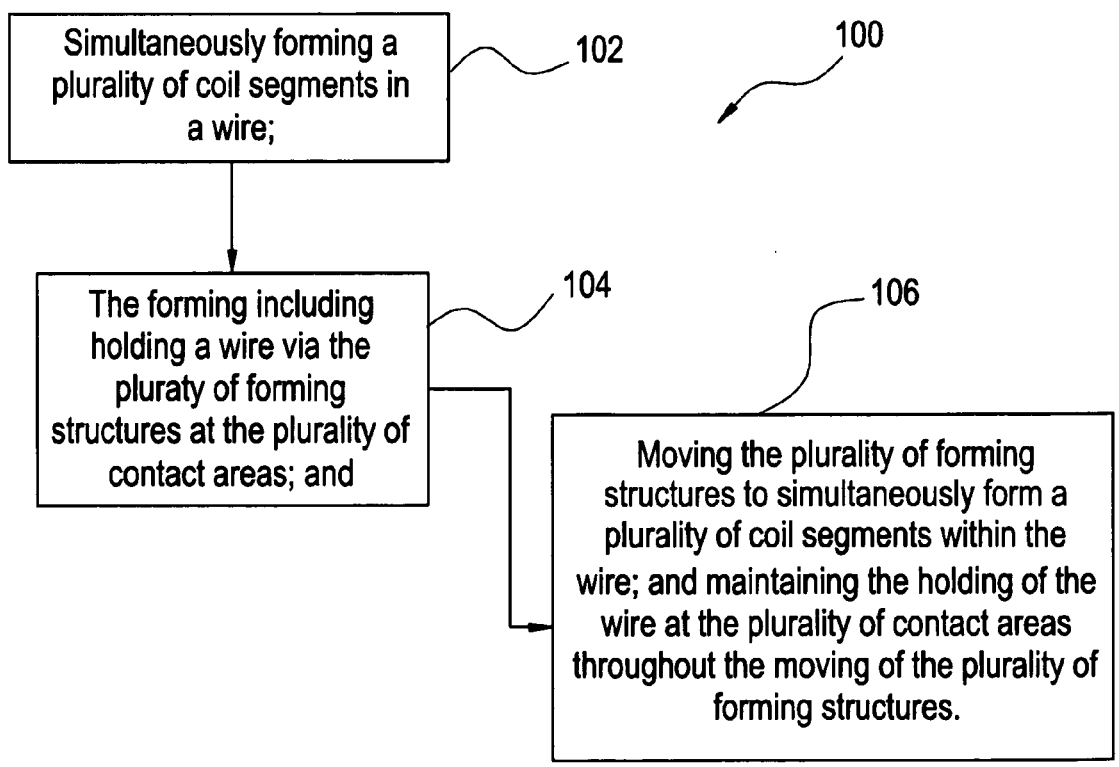
FIG. 9 is a block diagram illustrating a method for forming a wire to include coil segments.

Referring now to FIG. 9, a method 100 for forming a wire to include coil segments will be described. The method 100 includes simultaneously forming a plurality of coil segments 12a-c in a wire 14, as shown in operational block 102. The simultaneous forming of the method 100 may include holding a wire 14 via the plurality of forming structures 16a-c at the plurality of contact areas 68a-c, as is shown in Operational Block 104. The forming may also include moving the plurality of forming structures 16a-c to simultaneously form a plurality of coil segments 12a-c within the wire 14, and maintaining the holding of the wire 14 at the plurality of contact areas 16a-c throughout the moving of the plurality of forming structures, as shown in Operational Block 106. By maintaining a constant hold on the wire 14 during movement of the plurality of forming structures 16a-c, slippage of the wire 14 over or between the forming structures 16a-c during coil segment 12a-c formation is avoided, and a work hardening or insulation damage that would be caused in a wire that would have to continually slide and bend along a contact point on the forming structures 16a-c is also avoided.

Moving in the method 100 may additionally include moving the plurality of forming structures 16a-c toward and away from each other along an axis 15 substantially parallel to the wire 14 in an unformed state, and moving at least one of the plurality of forming structures 16a-c in an substantially off-axis direction 17. The moving may also be actuated by activating at least one actuating device 18, 20, 28a-c, and 70a-c associated with said plurality of forming structures 16a-c.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. An apparatus for forming a wire to include coil segments useable in a dynamoelectric machine, the apparatus comprising:
   a plurality of forming structures simultaneously moveable along an axis into a coil segment forming configuration, at least a number of said plurality of forming structures being configured to hold a wire;
   at least one articulating actuating device associated with at least two of said plurality of forming structures and configured to simultaneously drive said at least two of said plurality of forming structures along the axis into said coil segment forming configuration, wherein said plurality of forming structures are moveable toward each other by said at least one articulating actuating device along an axis substantially parallel to said wire in an unformed state, and alternatingly moveable by said at least one articulating actuating device in a substantially off-axis direction, said substantially off-axis direction runs substantially orthogonal to said axis running substantially parallel to said unformed wire, said at least one articulating actuator includes an on-axis articulating actuator and an off-axis articulating actuator, wherein said on-axis articulating actuator moves said plurality of forming structures along said axis substantially parallel to said unformed wire, and said off-axis articulating actuator moves every other forming structure of said plurality of forming structures in said substantially off-axis direction; and at least one clamping actuator, said at least one clamping actuator allows one portion and another portion of said forming structure to close on said wire, wherein said on-axis articulating actuator is a gate structure, said off-axis actuator is a rod structure, and said clamping actuator is at least one of a tension spring and lead screw.

2. An apparatus according to claim 1, wherein at least a number of said plurality of forming structures includes a convex and a concave portion, wherein said convex portion and said concave portion are closable upon said wire.

3. An apparatus for forming a wire to include coil segments useable in a dynamoelectric machine, the apparatus comprising:

a plurality of forming structures simultaneously moveable along an axis into a coil segment forming configuration, at least a number of said plurality of forming structures being configured to hold a wire;

at least one articulating actuating device associated with at least two of said plurality of forming structures and configured to simultaneously drive said at least two of said plurality of forming structures along the axis into said coil segment forming configuration, wherein said plurality of forming structures are moveable toward each other by said at least one articulating actuating device along an axis substantially parallel to said wire in an unformed state, and alternatingly moveable by said at least one articulating actuating device in a substantially off-axis direction, said substantially off-axis direction runs substantially orthogonal to said axis running substantially parallel to said unformed wire, said at least one articulating actuator includes an on-axis articulating actuator and an off-axis articulating actuator, wherein said on-axis articulating actuator moves said plurality of forming structures along said axis substantially parallel to said unformed wire, and said off-axis articulating actuator moves every other forming structure of said plurality of forming structures in said substantially off-axis direction and at least one push actuator, said at least one push actuator allows one portion and another portion of said forming structure to close on said wire, wherein said on-axis articulating actuator is a gate structure, said off-axis actuator is a rod structure, and said push actuator is at least one of a compression spring and lead screw.

4. An apparatus according to claim 3, wherein at least a number of said plurality of forming structures includes a convex and a concave portion, wherein said convex portion and said concave portion are closable upon said wire.

* * * * *